United States Patent
Cui et al.

(10) Patent No.: US 12,052,476 B2
(45) Date of Patent: Jul. 30, 2024

(54) METHOD FOR DETERMINING LOCATION OF FOCUS, ELECTRONIC DEVICE, AND STORAGE MEDIUM

(71) Applicant: BEIJING XIAOMI MOBILE SOFTWARE CO., LTD., Beijing (CN)

(72) Inventors: Baoqiu Cui, Beijing (CN); Ruiduan Wang, Beijing (CN); Hua Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 235 days.

(21) Appl. No.: 17/382,784

(22) Filed: Jul. 22, 2021

(65) Prior Publication Data

US 2022/0239989 A1 Jul. 28, 2022

(30) Foreign Application Priority Data

Jan. 25, 2021 (CN) .......................... 202110093219.0

(51) Int. Cl.
*H04N 21/482* (2011.01)
*H04N 21/431* (2011.01)

(52) U.S. Cl.
CPC ....... *H04N 21/482* (2013.01); *H04N 21/4312* (2013.01)

(58) Field of Classification Search
CPC .................................................. H04N 21/40
See application file for complete search history.

(56) References Cited

U.S. PATENT DOCUMENTS

| 7,113,168 | B2 * | 9/2006 | Oya ...................... G06F 3/0362 |
| | | | 345/157 |
| 8,281,258 | B1 * | 10/2012 | Dixon ................. G06F 3/04892 |
| | | | 715/854 |
| 9,357,250 | B1 * | 5/2016 | Newman .......... H04N 21/41265 |
| 10,521,101 | B2 * | 12/2019 | Phillips ................. G06F 3/0485 |

(Continued)

FOREIGN PATENT DOCUMENTS

| CN | 102088639 A | 6/2011 |
| CN | 108235091 A | 6/2018 |
| JP | 2019067127 A | 4/2019 |

OTHER PUBLICATIONS

European Patent Application No. 21187846.7, Search and Opinion dated Jan. 20, 2022, 13 pages.

(Continued)

*Primary Examiner* — Mushfikh I Alam
(74) *Attorney, Agent, or Firm* — Cozen O'Connor

(57) ABSTRACT

The disclosure provides a method for determining a location of a focus, an apparatus for determining a location of a focus, and an electronic device, and relates to the field of electronic devices. The method includes: obtaining a current location of the focus in an electronic device; determining a current page element located by the focus based on the current location of the focus; obtaining an instruction for controlling the focus; obtaining a movement direction of the focus based on the instruction; obtaining a layout direction of the current page element; returning to a parent page element of the current page element in response that the movement direction of the focus is inconsistent with the layout direction; and determining the location of the focus in the parent page element.

17 Claims, 8 Drawing Sheets

(56) References Cited

U.S. PATENT DOCUMENTS

| | | | |
|---|---|---|---|
| 2003/0106057 A1* | 6/2003 | Perdon | H04N 21/47 348/565 |
| 2005/0108750 A1* | 5/2005 | Nishikawa | H04N 21/4316 725/38 |
| 2007/0092243 A1 | 4/2007 | Allen et al. | |
| 2008/0109753 A1 | 5/2008 | Karstens | |
| 2009/0219304 A1* | 9/2009 | Martin | H04N 21/47 345/684 |
| 2012/0249571 A1* | 10/2012 | Houjou | H04N 21/2743 345/589 |
| 2013/0271404 A1* | 10/2013 | Choi | H04N 21/41265 345/173 |
| 2014/0123191 A1* | 5/2014 | Hahn | H04N 21/482 725/43 |
| 2014/0168122 A1* | 6/2014 | Jiang | G06F 3/0482 345/173 |
| 2014/0189742 A1* | 7/2014 | Hyoung | H04N 21/42204 725/44 |
| 2014/0245353 A1* | 8/2014 | Raza | H04N 21/47 725/44 |
| 2015/0067738 A1* | 3/2015 | Lilleness | H04N 21/4314 725/58 |
| 2017/0090703 A1* | 3/2017 | Iskandarov | G06F 3/0485 |
| 2018/0113579 A1 | 4/2018 | Johnston et al. | |
| 2019/0346991 A1* | 11/2019 | Ishigaki | G06F 3/04842 |

OTHER PUBLICATIONS

Chinese Patent Application No. 202110093219.0, Office Action dated Mar. 17, 2021, 6 pages.

Chinese Patent Application No. 202110093219.0, English translation of Office Action dated Mar. 17, 2021, 8 pages.

Japanese Patent Application No. 2021-122528, Office Action dated Aug. 30, 2022, 4 pages.

Japanese Patent Application No. 2021-122528, English translation of Office Action dated Aug. 30, 2022, 4 pages.

* cited by examiner

METHOD FOR DETERMINING LOCATION OF FOCUS, ELECTRONIC DEVICE, AND STORAGE MEDIUM

CROSS-REFERENCE TO RELATED APPLICATION

This application is based on and claims priority to Chinese Patent Application No. 202110093219.0 filed on Jan. 25, 2021, the content of which is hereby incorporated by reference in its entirety into this disclosure.

TECHNICAL FIELD

The disclosure relates to the field of electronic device technologies, and more particularly, to a method for determining a location of a focus, an electronic device, and a storage medium.

BACKGROUND

Electronic devices such as smart TVs (televisions) are becoming more and more widely used. Smart TVs are TV products designed for satisfying diverse and specific needs of users. The smart TV, based on Internet application technologies, typically has an open operating system, an open chip, and an open application platform, to achieve two-way human-computer interactions and to integrate multiple functions such as audios, videos, entertainment, and data, which brings to users a more enjoyable experience.

Smart TV provides rich human-computer interactions. For example, in a page provided by smart TV (for example, operation interface or menu), users are allowed to move a focus to windows, buttons, items, and other elements by operating up, down, left, and right through a remote control.

In the related art, in the method of moving the focus, all the elements on the page provided by the smart TV are collected, and related calculations are performed to determine the location of the focus. However, such method requires calculation on all the elements on the page. With the increased number of page elements, the moving operation of the focus will become too slow, which negatively affects user experience.

SUMMARY

Embodiments of a first aspect of the disclosure provide a method for determining a location of a focus. The method includes: obtaining a current location of the focus in an electronic device; determining a current page element located by the focus based on the current location of the focus; obtaining an instruction for controlling the focus; obtaining a movement direction of the focus based on the instruction; obtaining a layout direction of the current page element; returning to a parent page element of the current page element in response that the movement direction of the focus is inconsistent with the layout direction; and determining the location of the focus in the parent page element.

Embodiments of a second aspect of the disclosure provide an electronic device. The electronic device includes: a processor and a memory for storing instructions executable by the processor. The processor is configured to execute instructions stored in the memory to perform the method according to the first aspect of the disclosure.

Embodiments of a third aspect of the disclosure provide a computer-readable storage medium having computer program instructions stored thereon, in which when the program instructions are executed by a processor of an electronic device, the electronic device is caused to perform the method according to the first aspect of the disclosure.

Additional aspects and advantages of the disclosure will be given in part in the following descriptions, become apparent in part from the following descriptions, or be learned from the practice of the disclosure.

BRIEF DESCRIPTION OF THE DRAWINGS

These and other aspects and advantages of the disclosure will become apparent and more readily appreciated from the following descriptions made with reference to the drawings, in which.

DETAILED DESCRIPTION

Figure 1:
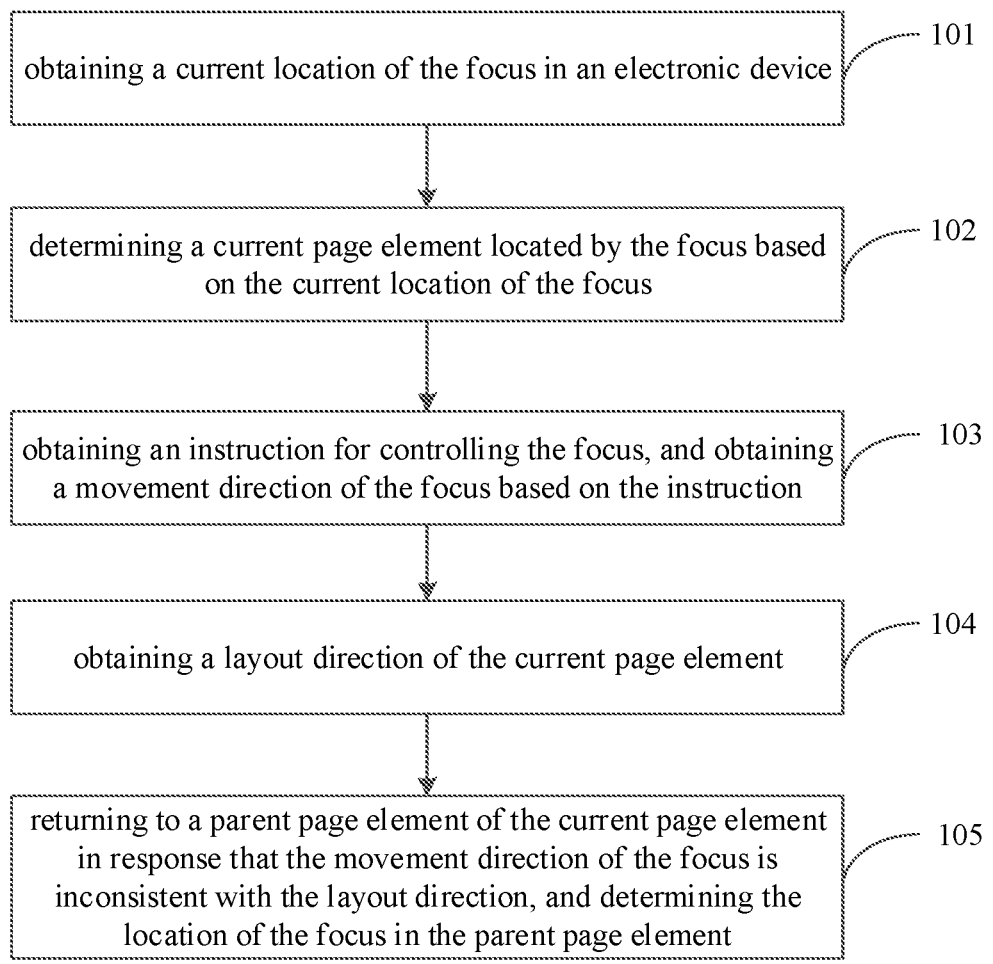
FIG. 1 is a flowchart of a method for determining a location of a focus according to some embodiments of the disclosure.

Reference will now be made in detail to exemplary embodiments, examples of which are illustrated in the drawings. The following description refers to the drawings in which the same numbers in different drawings represent the same or similar elements unless otherwise represented. The implementations set forth in the following description of exemplary embodiments do not represent all implementations consistent with the disclosure.

The terms used in the embodiments of the disclosure are only for the purpose of describing specific embodiments, and are not intended to limit the embodiments of the disclosure. The singular forms of "a" and "the" used in the embodiments of the disclosure are also intended to include plural forms, unless the context clearly indicates other meanings. It should also be understood that the term "and/or" as used herein refers to and includes any or all possible combinations of one or more associated listed items.

It should be understood that although terms "first", "second" and "third" may be used to describe various information in the embodiments of the disclosure, the information should not be limited to these terms. These terms are only used to distinguish the same type of information from each other. For example, without departing from the scope of the embodiments of the disclosure, the first information may also be referred to as the second information, and similarly, the second information may also be referred to as the first information. Depending on the context, the terms "in response that" and "if" as used herein are interpreted as "when", "while" or "in response to determining that".

The embodiments of the disclosure are described in detail below, and examples of the embodiments are shown in the drawings, in which the same or similar reference numerals indicate the same or similar elements throughout. The embodiments described below with reference to the drawings are exemplary, and are intended to explain the disclosure, but should not be construed as limiting the disclosure.

The method for determining the location of the focus, the apparatus for determining the location of the focus, and the electronic device in the embodiments of the disclosure are described below with reference to the drawings.

The method for determining the location of the focus according to the embodiments of the disclosure may be executed by the electronic device. The electronic device may be a smart TV, or a tablet computer with a remote control, which is not limited herein.

In the embodiments of the disclosure, the electronic device may be provided with a processing component, a storage component, and a driving component. Optionally, the driving component and the processing component are integrated. The storage component may store an operating system, application programs, or other program modules. The processing component may implement or perform the method for determining the location of the focus in the embodiments of the disclosure by executing the application programs stored in the storage component.

FIG. 1 is a flowchart of a method for determining a location of a focus according to some embodiments of the disclosure.

The method for determining the location of the focus in the embodiments of the disclosure is executed by the apparatus for determining the location of the focus in the embodiments of the disclosure. The apparatus may be configured in the electronic device to obtain the current location of the focus in the electronic device, determine the current page element located by the focus based on the current location of the focus, obtain the instruction for controlling the focus, obtain the movement direction of the focus based on the instruction, obtain the layout direction of the current page element, return to the parent page element of the current page element in response that the movement direction of the focus is inconsistent with the layout direction, and determine the location of the focus in the corresponding parent page element, thereby improving the speed and accuracy of the movement of the focus.

As illustrated in FIG. 1, the method for determining the location of the focus includes the following.

At block 101, a current location of the focus in an electronic device is obtained. The electronic device may be a smart TV.

It should be noted that the focus described in some embodiments may be the focus of the smart TV, that is, the focus may follow up, down, left, and right operations of the remote control of the user in the operation interface or menu of the smart TV, to move to corresponding windows, buttons, images, entries, and other elements, so that the element become the focus state, and the element that becomes the focus state may be clicked or subjected to other further operations. Visually, the element with the focus state may be added with diverse visual effects such as focus frame (or box) or color change, which intuitively follows the up, down, left, and right operations of the remote control to move on the interface of the smart TV, to achieve the corresponding human-computer interaction selection. The focus frame (or box) is more versatile and commonly used.

In some embodiments of the disclosure, the current location of the focus in the electronic device may be obtained based on a preset obtaining algorithm, and the preset obtaining algorithm may be calibrated based on actual conditions.

At block 102, a current page element located by the focus is determined based on the current location of the focus.

In detail, when the user uses the remote control to operate the electronic device, the electronic device may obtain the current location of the focus in the electronic device based on the preset obtaining algorithm, and determine the current page element located by the focus based on the current location of the focus, i.e., the element that becomes the focus state.

At block 103, an instruction for controlling the focus is obtained, and a movement direction of the focus is obtained based on the instruction. The movement direction may be one of up, down, left or right directions.

In some embodiments, the user sends the instruction through the remote control. For example, the user operates up, down, left or right button of the remote control, and the corresponding instruction is generated and sent to the electronic device. The remote control may be a Bluetooth remote control or an infrared remote control.

In detail, when the user uses the remote control to control the electronic device, the user operates the up, down, left or right button of the remote control, and the corresponding instruction is generated and sent to the electronic device. After determining the current page element located by the focus, the electronic device obtains (receives) the instruction, and parses the instruction to obtain the movement direction of the focus.

It should be noted that the movement direction of the focus in the embodiments corresponds to the up, down, left or right button of the remote control. For example, when the user sends the instruction by operating on the up button of the remote control, the movement direction of the focus obtained by the electronic device through parsing the instruction is upward. When the user sends the instruction by operating on the left button of the remote control, the movement direction of the focus obtained by the electronic device through parsing the instruction is left.

At block 104, a layout direction of the current page element is obtained.

The layout direction may be horizontal or vertical.

Figure 2:
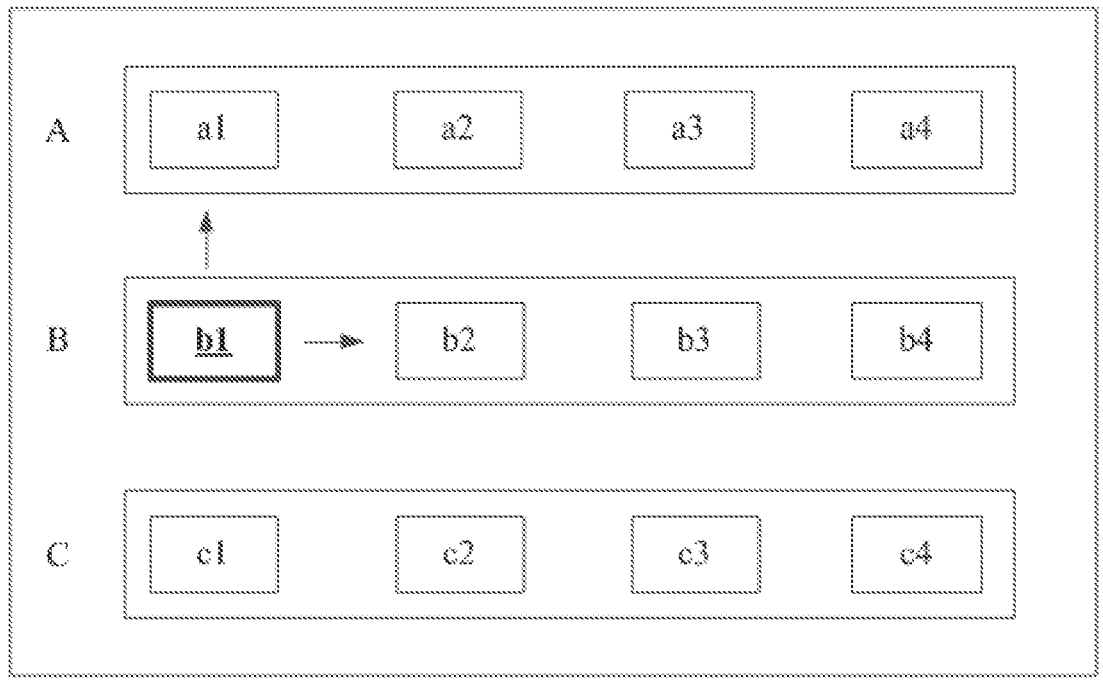
FIG. 2 is a schematic diagram of a page element according to some embodiments of the disclosure.

For example, as illustrated in FIG. 2, it is assumed that the current page element is element B, and the layout direction of element B is horizontal, that is, elements b1, b2, b3, and b4 are arranged horizontally. It is assumed that the current page element is element X1, and the layout direction of element X1 is vertical, that is, elements A, B, and C are arranged horizontally. In other words, the layout direction of the current page element may be the layout direction of next sub-elements in the current page element.

It should be noted that the layout direction of the current page element described in some embodiments may be an inherent attribute of the current page, which may be obtained directly. The inherent attribute may be an attribute defined in the code by those skilled in the art when designing the page. In other words, the layout direction of the page element is fixed after the design of the page is completed.

In detail, when the user uses the remote control to operate the electronic device, after the electronic device obtains the movement direction of the focus, the inherent attribute of the current page is obtained, and the inherent attribute is analyzed to obtain the layout direction of the current page element.

It should be noted that when the page is loaded by the electronic device (that is, the electronic device executes the generated code of the page), the relevant inherent attribute is generated, and the inherent attribute is provided to the electronic device for direct obtaining (calling).

At block 105, a parent page element of the current page element is returned to in response that the movement direction of the focus is inconsistent with the layout direction, and the location of the focus in the parent page element is determined.

In some embodiments of the disclosure, when the movement direction is upward or downward, the movement direction is consistent with the layout direction when the layout direction is vertical. When the movement direction is left or right, the movement direction is consistent with the layout direction when the layout direction horizontal.

Further, in some embodiments of the disclosure, the method for determining the location of the focus may further include: determining the location of the focus in the current page element in response that the movement direction of the focus is consistent with the layout direction and a side of the movement direction of the focus is not an edge of the current page element.

In detail, when the user uses the remote control to operate the electronic device, the electronic device directly obtains the layout direction of the current page element after obtaining the movement direction of the focus, and determines whether the movement direction of the focus is consistent with the layout direction. In response that the movement direction of the focus is inconsistent with the layout direction, it may return to the parent page element of the current page element, and the location of the focus is determined in the corresponding parent page element. The electronic device moves the focus to the page element at that location, that is, the page element at this location becomes the focus state. In response that the movement direction of the focus is consistent with the layout direction, it is further determined whether the side of the movement direction of the focus is the edge of the current page element. If the side of the movement direction of the focus is not the edge of the current page element, the location of the focus is determined in the current page element, and the electronic device moves the focus to the page element at that location, that is, the page element at that location becomes the focus state.

As illustrated in FIG. 2, it is assumed that the current location of the focus is the location of element b1 (that is, element b1 is in the focus state), the current page element is element B, and the layout direction of element B is horizontal. In response that the movement direction of the focus is upward, it is determined that the movement direction of the focus is inconsistent with the layout direction of element B, parent page element X1 of element B is returned to, and the location of the focus may be determined in element X1, and then the focus is moved to the page element at that location.

In response that the movement direction of the focus is left, it is determined that the movement direction of the focus is consistent with the layout direction of element B, and the side of the movement direction is not the edge of element B, the location of the focus may be determined in element B, and then the focus may be moved to the page element at that location.

In some embodiments of the disclosure, the current location of the focus in the electronic device is obtained, and the current page element located by the focus is determined based on the current location of the focus, and then the instruction for controlling the focus is obtained, and the movement direction of the focus is obtained based on the instruction. The layout direction of the current page element is obtained. In response that the movement direction of the focus is inconsistent with the layout direction, it may return to the parent page element of the current page element, and the location of the focus is determined in the corresponding parent page element. As a result, the movement location of the focus may be quickly and accurately determined through the layout direction of the current page element and the movement direction of the focus, thereby improving the speed and accuracy of the movement of the focus, and enhancing the user experience.

Figure 3:
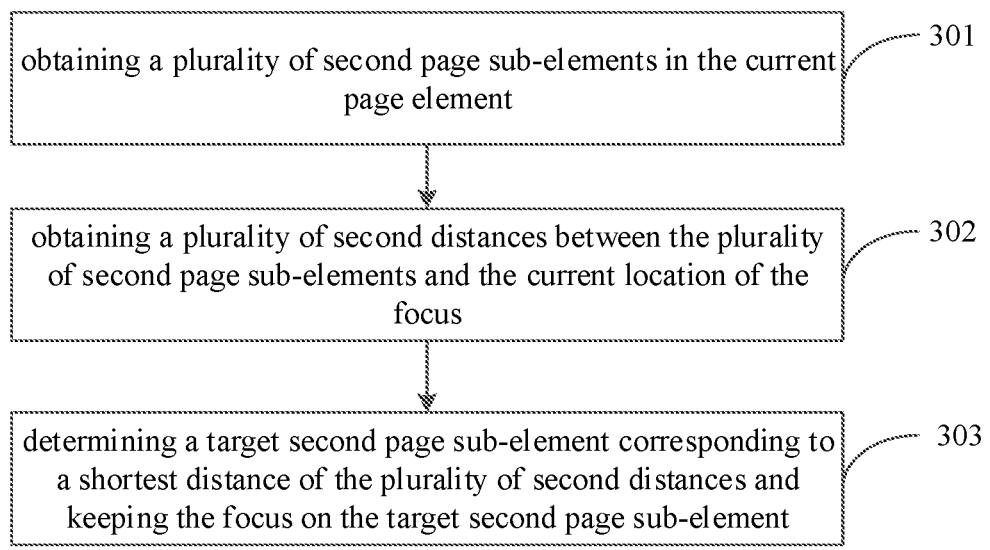
FIG. 3 is a flowchart of another method for determining a location of a focus according to some embodiments of the disclosure.

In order to clearly illustrate the above embodiments, in some embodiments of the disclosure, as illustrated in FIG. 3, determining the location of the focus in the current page element may include the following.

At block 301, a plurality of second page sub-elements in the current page element are obtained.

Figure 4:
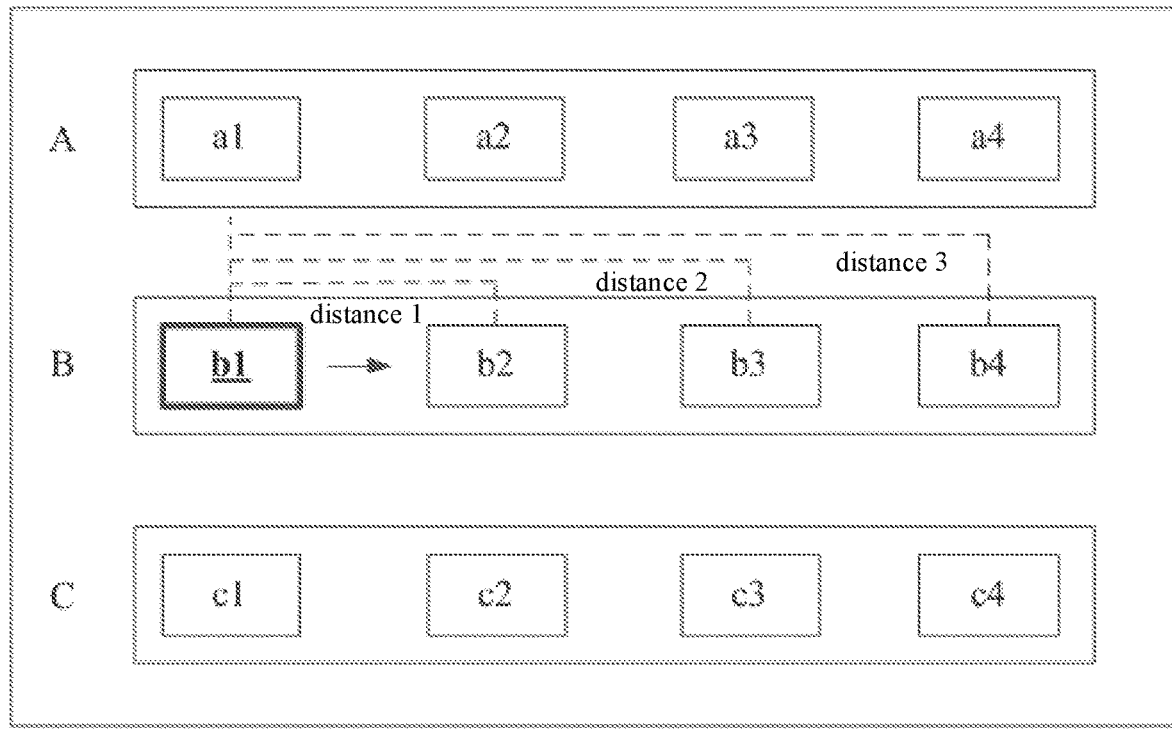
FIG. 4 is a schematic diagram of another page element according to some embodiments of the disclosure.

As illustrated in FIG. 4, it is assumed that the current page element is B, and a plurality of second page sub-elements may be b1, b2, b3, and b4. Elements b1, b2, b3, and b4 are the smallest elements in the page. For example, if the page is a TV show selection page, elements b1, b2, b3, and b4, and elements a1, a2, a3, and a4 may be TV shows, and element B and element A are virtual elements. It should be noted that the virtual elements described in some embodiments may be defined in the code by those skilled in the art when designing the page, and the smallest elements in the virtual element are in a row or column.

At block 302, a plurality of second distances between the plurality of second page sub-elements and the current location of the focus are obtained.

In some embodiments of the disclosure, the plurality of second distances between the plurality of second page sub-elements and the current location of the focus are calculated based on a preset distance algorithm, where the preset distance algorithm is calibrated based on actual conditions.

At block 303, a target second page sub-element corresponding to a shortest distance of the plurality of second distances is determined, and the focus is kept on the target second page sub-element.

In detail, when the user uses the remote control to operate the electronic device, in response that the movement direction of the focus is consistent with the layout direction and the side of the movement direction of the focus is not the edge of the current page element, the plurality of second page sub-elements in the current page element are obtained, and the plurality of second distances between the plurality of second page sub-elements and the current location of the focus are determined based on the preset distance algorithm. The shortest second distance is determined from the plurality of second distances, and the target second page sub-element corresponding to the shortest distance of the plurality of second distances is determined. The focus is kept on the target second page sub-element, that is, the target second page sub-element becomes the focus state.

As illustrated in FIG. 4, it is assumed that the current location of the focus is the location of element b1 (that is, element b1 is in the focus state), and the current page element is element B, where the layout direction of element B is horizontal. When the movement direction of the focus obtained by the electronic device is right, the electronic device determines that the movement direction of the focus is consistent with the layout direction of element B, and the side of the movement direction of the focus is not the edge of element B. Distances between element b1 and element b2, element b1 and element b3, and element b1 and element b4 (i.e., the distance 1, 2 and 3) are calculated respectively, and the shortest distance is obtained. Based on the shortest distance, it is determined that the target second page sub-element is element b2, and the focus remains on element b2 (that is, element b2 becomes the focus state). Therefore, it may calculate the sub-elements in element B only, which greatly reduces the amount of calculation, so that the location of the focus may be quickly determined.

Figure 5:
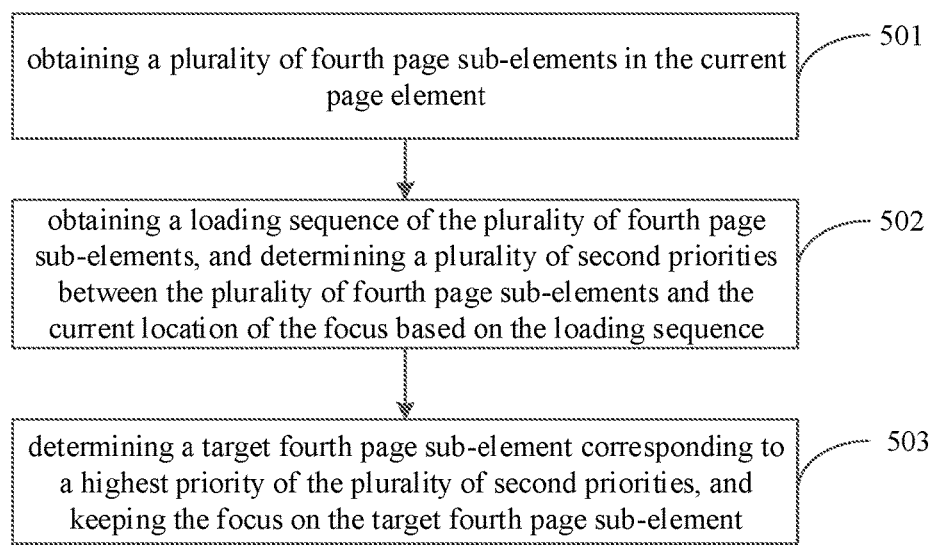
FIG. 5 is a flowchart of another method for determining a location of a focus according to some embodiments of the disclosure.

In some embodiments, as illustrated in FIG. 5, determining the location of the focus in the current page element includes the following.

At block 501, a plurality of fourth page sub-elements in the current page element are obtained.

As illustrated in FIG. 2, it is assumed that the current page element is B, and the plurality of fourth page sub-elements may be b1, b2, b3, and b4.

At block 502, a loading sequence of the plurality of fourth page sub-elements is obtained, and a plurality of second priorities between the plurality of fourth page sub-elements and the current location of the focus are determined based on the loading sequence.

It should be noted that the loading sequence in some embodiments is calibrated based on a loading strategy of page design, where the loading strategy is calibrated based on requirements by the relevant page developer. In addition, when the page is loaded by the electronic device (that is, the electronic device executes the generated code of the page), the loading sequence of various elements in the page is provided to the electronic device for direct obtaining (calling) when needed.

At block 503, a target fourth page sub-element corresponding to a highest priority of the plurality of second priorities is determined, and the focus is kept on the target fourth page sub-element.

In detail, when the user uses the remote control to operate the electronic device, and when the electronic determines that the movement direction of the focus is consistent with the layout direction, and the side of the movement direction of the focus is not the edge of the current page element, the plurality of fourth page sub-elements in the current page element are obtained, the loading sequence of the plurality of fourth page sub-elements is obtained, the plurality of second priorities between the plurality of fourth page sub-elements and the current location of the focus are determined based on the loading sequence, the target fourth page sub-element is determined based on the highest priority from the plurality of second priorities, and the focus is kept on the target fourth page sub-element, that is, the target fourth page sub-element becomes the focus state.

As illustrated in FIG. 2, it is assumed that the current location of the focus is the location of element b1 (that is, element b1 is in the focus state), the current page element is element B, and the layout direction of element B is horizontal. When the movement direction of the focus obtained by the electronic device is right, the electronic device determines that the movement direction of the focus is consistent with the layout direction of element B, and the side of the movement direction of the focus is not the edge of element B. The loading sequence of element b2, element b3 and element b4 are obtained, the element loaded first is used as the target element (that is, the target fourth page sub-element), and the focus remains on the target element (that is, the target element becomes the focus state).

In some embodiments, the method for determining the location of the focus may further include: in response that the movement direction of the focus is consistent with the layout direction, and the side of the movement direction of the focus is the edge of the current page element, returning to the parent page element of the current page element, and the location of the focus is determined in the corresponding parent page element.

Returning to the parent page element of the current page element, and determining the location of the focus in the corresponding parent page element includes: returning to a previous page element of the current page element, and determining the location of the focus in the previous page element.

In detail, when the user uses the remote control to operate the electronic device, if the electronic device determines that the movement direction of the focus is consistent with the layout direction, and the side of the movement direction of the focus is the edge of the current page element, it may return to the previous page element of the current page element, and the location of the focus is determined in the previous page element.

Figure 6:
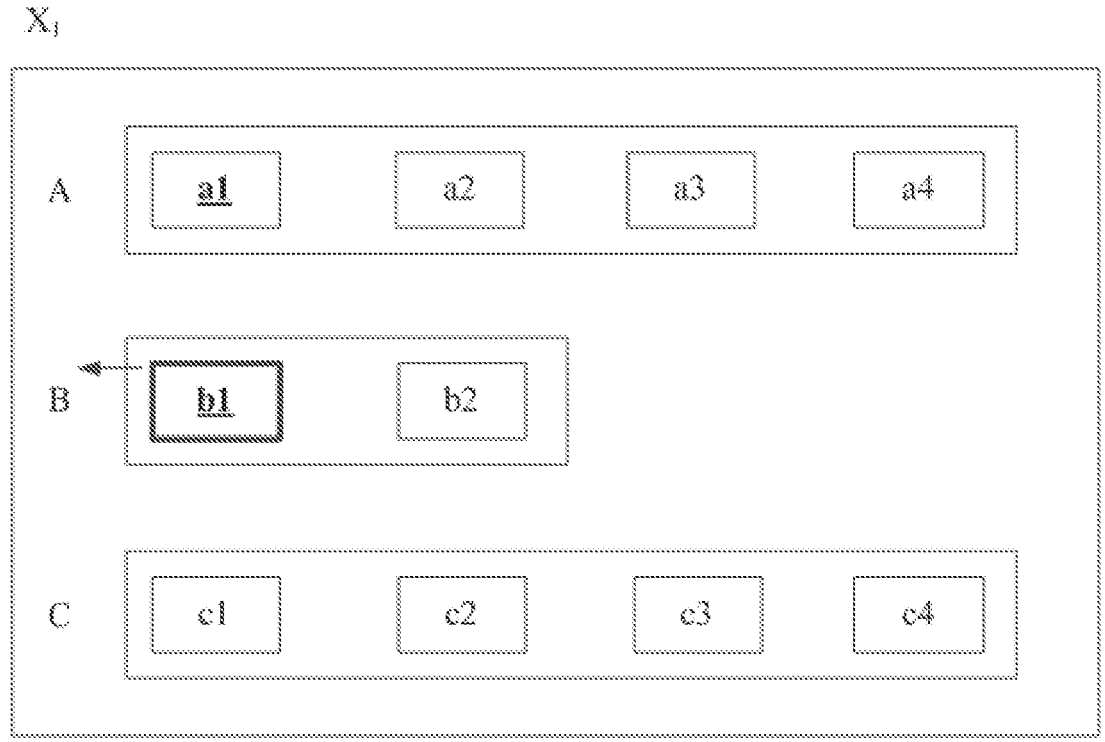
FIG. 6 is a schematic diagram of another page element according to some embodiments of the disclosure.

As illustrated in FIG. 6, it is assumed that the current location of the focus is the location of element b1 (that is, element b1 is in the focus state), and the current page element is element B, where the layout direction of element B is horizontal. When the movement direction of the focus obtained by the electronic device is left, the electronic device determines that the movement direction of the focus is consistent with the layout direction of element B, and the side of the movement direction of the focus is the edge of element B, it may return to previous page element X1 of element B. Element X1 includes element A, element B, and element C. At this time, the target element in element X1 is determined based on the preset algorithm, for example, the target element is determined to be element A. The electronic device calculates the distances between element b1 and element a1, element b1 and element a2, element b1 and element a3, and element b1 and element a4 respectively, and obtain the shortest distance, and then element a1 is determined as the location of the focus based on the shortest distance. Alternatively, the electronic device may obtain the loading sequence of element a1, element a2, element a3 and element a4, and determine the location of the focus based on the loading sequence, for example, moving to element a1.

It should be noted that the preset algorithm described in some embodiments is calibrated based on actual conditions. For example, the preset algorithm may be written by relevant person who designed the webpage, and the preset algorithm includes changing the movement direction of the focus. For example, the direction changes from left to upward, or from right to downward, which is not limited herein. In addition, the preset algorithm may include determining whether an element exists in the movement direction of the focus, and if there is the element exists in the movement direction of the focus, the element closest to the focus may be used as the target element.

Figure 11:
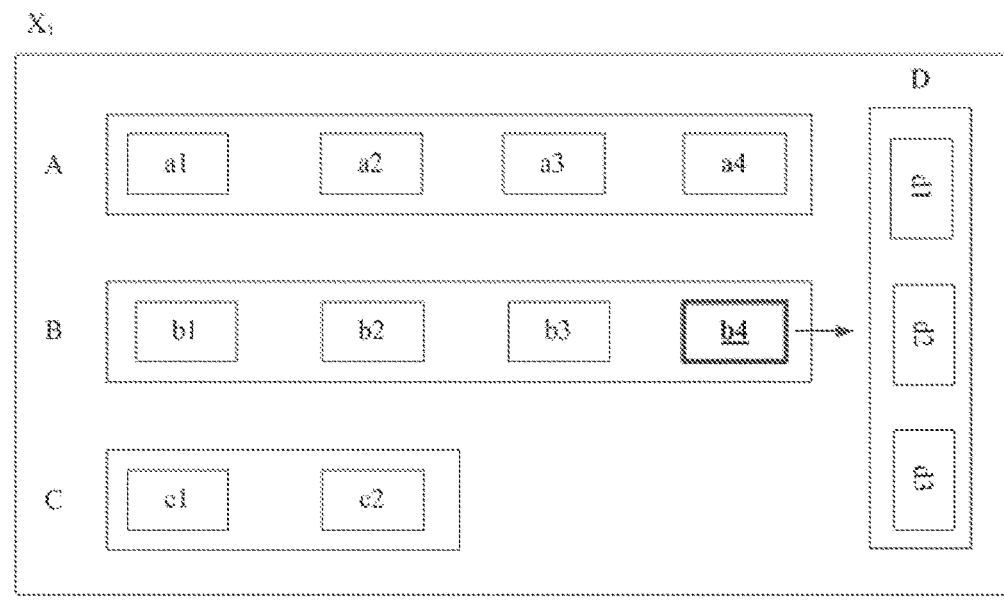
FIG. 11 is a schematic diagram of another page element according to some embodiments of the disclosure.

As illustrated in FIG. 11, it is assumed that the current location of the focus is the location of element b4 (that is, element b4 is in the focus state), and the current page element is element B, where the layout direction of element B is horizontal. When the movement direction of the focus obtained by the electronic device is right, the electronic device determines that the movement direction of the focus is consistent with the layout direction of element B, and the side of the movement direction of the focus is the edge of element B, it may return to previous page element X1 of element B. Element X1 includes element A, element B, element C, and element D. At this time, the target element in element X1 is determined as element D based on the preset algorithm, and then the electronic device calculates the distances between element b4 and element d1, element b4 and element d2, and element b4 and element d3 respectively, and the shortest distance is obtained, and then element d2 is determined as the location where the focus moves to, based on the shortest distance. Alternatively, the electronic device may obtain the loading sequence of element d1, element d2, and element d3, and determine the location of the focus based on the loading sequence, for example, moving to element d1.

In some embodiments of the disclosure, returning to the parent page element of the current page element, and determining the location of the focus in the corresponding parent page element, may include: returning to a previous page element of the current page element; and determining the location of the focus in the previous page element in response that a layout direction of the previous page element is consistent with the movement direction of the focus.

In detail, when the user uses the remote control to operate the electronic device, the electronic device may return to the previous page element of the current page element and obtain the layout direction of the previous page element in response that the movement direction of the focus is inconsistent with the layout direction, and determines whether the layout direction of the previous page element is consistent with the movement direction of the focus. If the layout direction of the previous page element is consistent with the movement direction of the focus, the location of the focus is determined in the previous page element.

Figure 7:
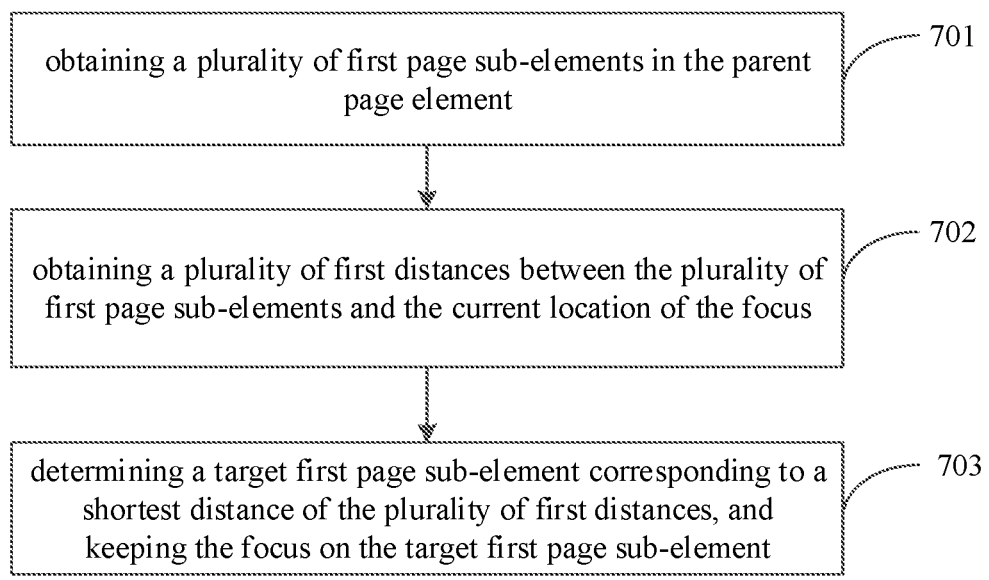
FIG. 7 is a flowchart of another method for determining a location of a focus according to some embodiments of the disclosure.

In order to clearly illustrate the above embodiments, in some embodiments of the disclosure, as illustrated in FIG. 7, determining the location of the focus in the corresponding parent page element may include the following.

At block 701, a plurality of first page sub-elements in the parent page element are obtained.

Figure 8:
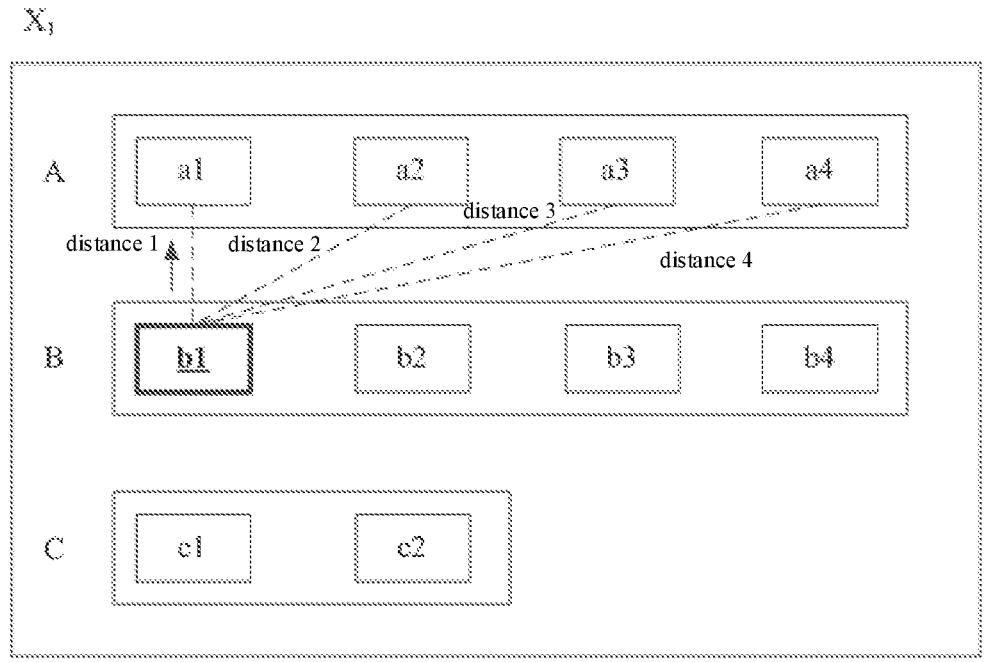
FIG. 8 is a schematic diagram of another page element according to some embodiments of the disclosure.

As illustrated in FIG. 8, it is assumed that the current location of the focus is the location of element b1 (that is, element b1 is in the focus state), the current page element is element B, and the movement direction of the focus is upward. The plurality of first page sub-elements of parent page element X1 are a1, a2, a3 and a4. Element X1 may include three lower-level sub-elements, namely, element A, element B and element C.

At block 702, a plurality of first distances between the plurality of first page sub-elements and the current location of the focus are obtained.

In some embodiments of the disclosure, the plurality of first distances between the plurality of first page sub-elements and the current location of the focus may be calculated based on a preset distance algorithm.

At block 703, a target first page sub-element corresponding to a shortest distance of the plurality of first distances is determined, and the focus is kept on the target first page sub-element.

In detail, when the user uses the remote control to operate the electronic device, when the electronic device determines that the layout direction of the previous page element is consistent with the movement direction of the focus, the target page element is determined from the previous page element based on the movement direction of the focus (for example, element A in FIG. 8). The plurality of first page sub-elements in the target page element are obtained, and the plurality of first distances between the plurality of first page sub-elements and the current location of the focus is calculated based on the preset distance algorithm. The shortest distance in the plurality of first distances is determined based on the plurality of first distances. The target first page sub-element is determined based on the shortest distance, and the focus is kept on the target first page sub-element, that is, the target first page sub-element becomes the focus state.

As illustrated in FIG. 8, it is assumed that the current location of the focus is the location of element b1 (that is, element b1 is in the focus state), and the current page element is element B, where the layout direction of element B is horizontal, and the layout direction of parent page element X1 of element B is vertical. In response that the movement direction of the focus obtained by the electronic device is upward, the electronic device may determine that the movement direction of the focus is inconsistent with the layout direction of element B, and then it may return to previous page element X1 of element B. The electronic device may determine that the movement direction of the focus is consistent with the layout direction of element X1, and then the electronic device determines the target element based on the movement direction of the focus. Element X1 includes element A, element B, and element C. At this time, the electronic device determines that the target element is element A, and then the electronic device calculates distances between element b1 and element a1, element b1 and element a2, element b1 and element a3, and element b1 and element a4 (i.e., distance 1, 2, 3, and 4), and obtains the shortest distance. The target first page sub-element is determined as element a1 based on the shortest distance, and the focus is kept on element a1 (i.e., element a1 becomes the focus state). Therefore, it may calculate the sub-elements in the element A only, which greatly reduces the amount of calculation, so that the location of the focus may be quickly determined.

Figure 9:
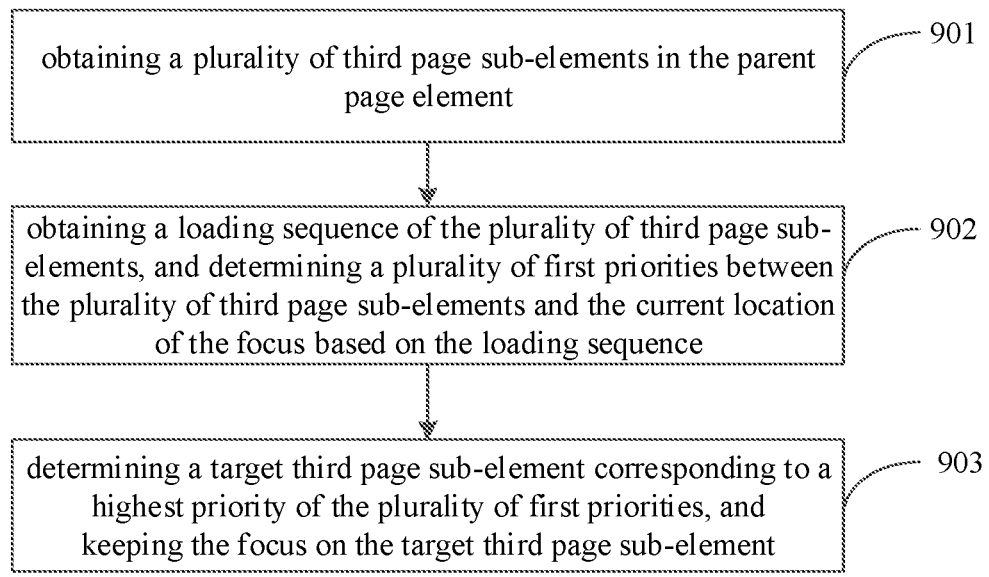
FIG. 9 is a flowchart of another method for determining a location of a focus according to some embodiments of the disclosure.

In some embodiments, as illustrated in FIG. 9, determining the location of the focus in the parent page element includes the following.

At block 901, a plurality of third page sub-elements in the parent page element are obtained.

As illustrated in FIG. 2, it is assumed that the current location of the focus is the location of element b1 (that is, element b1 is in the focus state), the current page element is element B, the movement direction of the focus is upward, and the plurality of third page sub-elements of parent page element X1 are a1, a2, a3 and a4. Element X1 may include three lower-level sub-elements, namely, element A, element B and element C.

At block 902, a loading sequence of the plurality of third page sub-elements is obtained, and a plurality of first priorities between the plurality of third page sub-elements and the current location of the focus are determined based on the loading sequence.

At block 903, a target third page sub-element corresponding to a highest priority of the plurality of first priorities is determined, and the focus is kept on the target third page sub-element.

In detail, when the user uses the remote control to operate the electronic device, and when the electronic device determines that the layout direction of the previous page element is consistent with the movement direction of the focus, the target page element may be determined from the previous page element based on the movement direction of the focus (for example, element A in FIG. 2). The plurality of third page sub-elements in the target page element are obtained respectively, and the loading sequence of the plurality of third page sub-elements is obtained, and the plurality of first priorities between the plurality of third page sub-elements and the current location of the focus may be determined based on the loading sequence. The target third page sub-element is determined based on the highest priority from the plurality of first priorities, and the focus is kept on the target third page sub-element, that is, the target third page sub-element becomes the focus state.

As illustrated in FIG. 2, it is assumed that the current location of the focus is the location of element b1 (that is, element b1 is in the focus state), and the current page element is element B, where the layout direction of element B is horizontal, and the layout direction of parent page element X1 of element B is vertical. In response that the movement direction of the focus obtained by the electronic device is upward, the electronic device may determine that the movement direction of the focus is inconsistent with the layout direction of element B, and return to previous page element X1 of element B. The electronic device may determine the movement direction of the focus is consistent with the layout direction of element X1. The electronic device determines the target element based on the movement direction of the focus. Element X1 includes element A, element B, and element C. At this time, the electronic device determines that the target element is element A, and obtains the loading sequence of element a1, element a2, element a3, and element a4. The element that is loaded first is used as the target element (that is, the target third page sub-element), and the focus is kept on the target element (that is, the target element becomes the focus state).

In some embodiments of the disclosure, the method for determining the location of the focus may further include: continuing to search for the parent page element until the parent page element whose movement direction is consistent with the movement direction of the focus is found in response that the layout direction of the previous page element is inconsistent with the movement direction of the focus; determining the location of the focus in the parent page element whose movement direction is consistent with the movement direction of the focus; and informing a user in response to no parent page element whose movement direction is consistent with the movement direction of the focus (for example, voice reminders and text reminders, which may be not limited herein).

Figure 10:
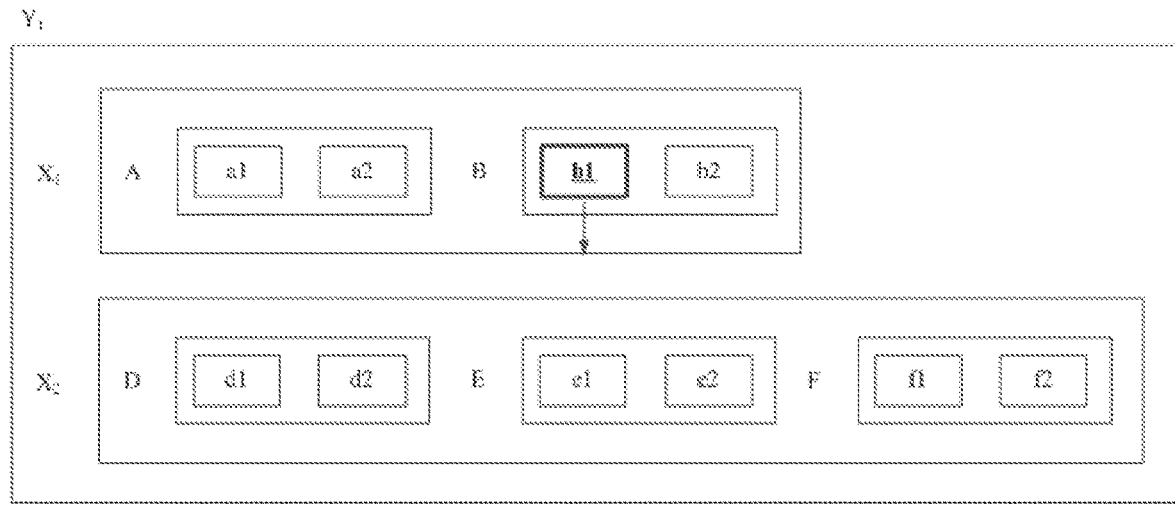
FIG. 10 is a schematic diagram of another page element according to some embodiments of the disclosure.

In detail, as illustrated in FIG. 10, it is assumed that the current location of the focus is the location of element b1 (that is, element b1 is in the focus state), and the current page element is element B, where the layout direction of element B is horizontal, the layout direction of parent page element X1 of element B is horizontal, and the layout direction of parent page element Y1 of element X1 is vertical. In response that the movement direction of the focus obtained by the electronic device is downward, the electronic device determines that the movement direction of the focus is inconsistent with the layout direction of element B, it may return to parent page element X1 of element B. The electronic device determines that the movement direction of the focus is also inconsistent with the layout direction of element X1, it may return to parent page element Y1 of element X1. The electronic device determines that the movement direction of the focus is consistent with the layout direction of element Y1, and the location of the focus is determined in parent page element Y1 whose movement direction is consistent with the movement direction of the focus.

In some embodiments of the disclosure, the method for determining the location of the focus may further include: recording the current location of the focus in the current page element; and positioning the focus to the current location in response that the focus returns to the current page element.

In detail, when the user uses the remote control to operate the electronic device, the electronic device records the current location of the focus in the current page element, and when the focus returns to the current page element, the focus is positioned to the current location.

As illustrated in FIG. 2, it is assumed that the current location of the focus is the location of element b1 (that is, element b1 is in the focus state), and the current page element is element B, where the layout direction of element B is horizontal, and the layout direction of parent page element X1 of element B is vertical. When the user uses the remote control to operate the electronic device, and when the focus is at the location of element a4, if the user sends a control instruction through the remote control to control the focus to move to the right, the focus jumps to element B. At this time, the electronic device positions the focus to the location of element b1 based on the previous record.

It should be noted that, as illustrated in FIG. 2, FIG. 4, FIG. 6, FIG. 8, FIG. 10, and FIG. 11, elements such as element A, element B, element C, and element D that include the smallest elements are virtual elements. The virtual elements may be defined in the code by the relevant technicians when designing the page, and the smallest elements in elements such as element A, element B, element C, and element D are all set in a row or column.

With the method for determining the location of the focus provided in the embodiment of the disclosure, the current location of the focus in the electronic device is obtained, and the current page element located by the focus is determined based on the current location of the focus, and then the instruction for controlling the focus is obtained, and the movement direction of the focus is obtained based on the instruction. The layout direction of the current page element is obtained. In response that the movement direction of the focus is inconsistent with the layout direction, it may return to the parent page element of the current page element, and the location of the focus is determined in the corresponding parent page element. As a result, the movement location of the focus may be quickly and accurately determined through the layout direction of the current page element and the movement direction of the focus, thereby improving the speed and accuracy of the movement of the focus, and enhancing the user experience.

Figure 12:
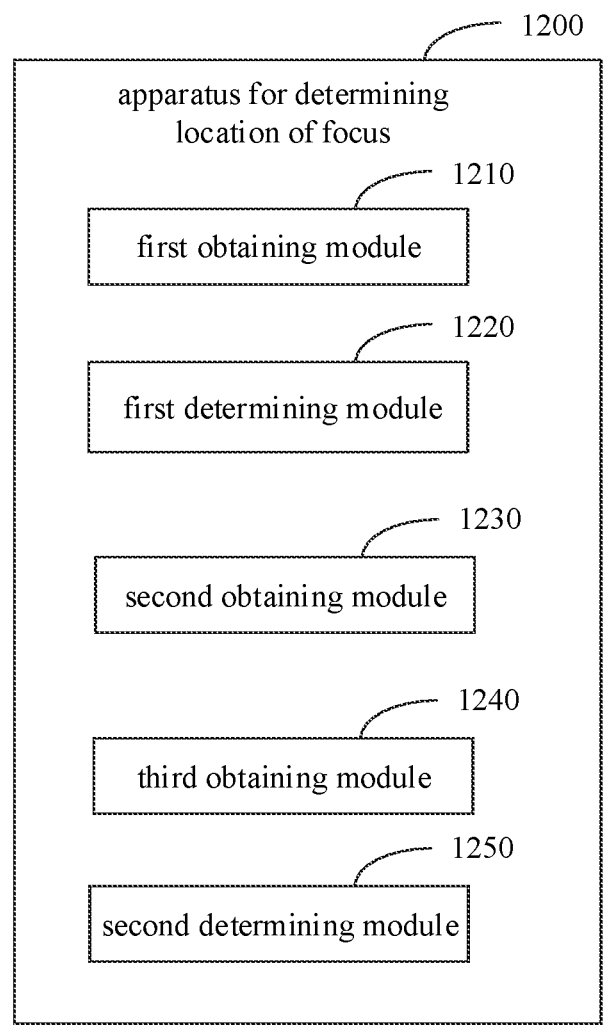
FIG. 12 is a block diagram of an apparatus for determining a location of a focus according to some embodiments of the disclosure.

FIG. 12 is a block diagram of an apparatus for determining a location of a focus according to some embodiments of the disclosure.

The apparatus for determining the location of the focus provided in the embodiments of the disclosure is configured in the electronic device to obtain the current location of the focus in the electronic device, determine the current page element located by the focus based on the current location of the focus, obtain the instruction for controlling the focus, obtain the movement direction of the focus based on the instruction, obtain the layout direction of the current page element, return to the parent page element of the current page element in response that the movement direction of the focus is inconsistent with the layout direction, and determine the location of the focus in the corresponding parent page element, thereby improving the speed and accuracy of the movement of the focus.

As illustrated in FIG. 12, the apparatus 1200 for determining the location of the focus includes: a first obtaining module 1210, a first determining module 1220, a second obtaining module 1230, a third obtaining module 1240, and a second determining module 1250.

The first obtaining module 1210 is configured to obtain a current location of the focus in an electronic device.

The first determining module 1220 is configured to determine a current page element located by the focus based on the current location of the focus.

The second obtaining module 1230 is configured to obtain an instruction for controlling the focus, and obtain a movement direction of the focus based on the instruction.

The third obtaining module 1240 is configured to obtain a layout direction of the current page element.

The second determining module 1250 is configured to return to a parent page element of the current page element in response that the movement direction of the focus is inconsistent with the layout direction, and determine the location of the focus in the parent page element.

In some embodiments, the second determining module 1230 is further configured to: obtain a plurality of first page sub-elements in the parent page element; obtain a plurality of first distances between the plurality of first page sub-elements and the current location of the focus; determine a target first page sub-element corresponding to a shortest distance of the plurality of first distances; and keep the focus on the target first page sub-element.

In some embodiments, the second determining module 1230 is further configured to: obtain a plurality of third page sub-elements in the parent page element; obtain a loading sequence of the plurality of third page sub-elements; determine a plurality of first priorities between the plurality of third page sub-elements and the current location of the focus based on the loading sequence; determine a target third page sub-element corresponding to a highest priority of the plurality of first priorities; and keep the focus on the target third page sub-element.

In some embodiments, the apparatus 1200 further includes: a third determining module, configured to determine the location of the focus in the current page element in response that the movement direction of the focus is consistent with the layout direction and a side of the movement direction of the focus is not an edge of the current page element.

In some embodiments, the third determining module is further configured to: obtain a plurality of second page sub-elements in the current page element; obtain a plurality of second distances between the plurality of second page sub-elements and the current location of the focus; determine a target second page sub-element corresponding to a shortest distance of the plurality of second distances; and keep the focus on the target second page sub-element.

In some embodiments, the third determining module is further configured to: obtain a plurality of fourth page sub-elements in the current page element; obtain a loading sequence of the plurality of fourth page sub-elements; determine a plurality of second priorities between the plurality of fourth page sub-elements and the current location of the focus based on the loading sequence; determine a target fourth page sub-element corresponding to a highest priority of the plurality of second priorities; and keep the focus on the target fourth page sub-element.

In some embodiments, the apparatus 1200 further includes: a fourth determining module, configured to return to the parent page element of the current page element in response that the movement direction of the focus is consistent with the layout direction and a side of the movement direction of the focus is an edge of the current page element, and determine the location of the focus in the parent page element.

In some embodiments, the fourth determining module is further configured to: return to a previous page element of the current page element; and determine the location of the focus in the previous page element.

In some embodiments, the second determining module 1230 is further configured to: return to a previous page element of the current page element; and determine the location of the focus in the previous page element in response that the layout direction of the previous page element is consistent with the movement direction of the focus.

In some embodiments, the second determining module 1230 is further configured to: continue to search for the parent page element until the parent page element whose movement direction is consistent with the movement direction of the focus is found in response that the layout direction of the previous page element is inconsistent with the movement direction of the focus; determine the location of the focus in the parent page element whose movement direction is consistent with the movement direction of the focus; and inform a user in response to no parent page element whose movement direction is consistent with the movement direction of the focus.

In some embodiments, the apparatus 1200 includes: a recording module and a positioning module. The recording module is configured to record the current location of the focus in the current page element. The positioning module is configured to position the focus to the current location in response that the focus returns to the current page element.

It should be noted that the foregoing explanation of the embodiments of the method for determining the location of the focus is also applicable to the apparatus for determining the location of the focus of the embodiments, which is not repeated herein.

With the apparatus for determining the location of the focus provided in the embodiments of the disclosure, the current location of the focus in the electronic device is obtained by the first obtaining module. The current page element located by the focus is determined by the first determining module based on the current location of the focus. The instruction for controlling the focus is obtained by the second obtaining module, and the movement direction of the focus is obtained by the second obtaining module based on the instruction. The layout direction of the current page element is obtained by the third obtaining module. The parent page element of the current page element is returned to by the second determining module in response that the movement direction of the focus is inconsistent with the layout direction. The location of the focus in the parent page element is determined by the second determining module. As a result, the movement location of the focus may be quickly and accurately determined through the layout direction of the current page element and the movement direction of the focus, thereby improving the speed and accuracy of the movement of the focus, and enhancing the user experience.

Embodiments of the disclosure in a third aspect provide an electronic device. The electronic device includes: a processor and a memory for storing instructions executable by the processor. The processor is configured to execute instructions to implement the method for determining the location of the focus.

In order to implement the above embodiments, the disclosure also provides a storage medium.

When the instructions in the storage medium are executed by the processor of the electronic device, the electronic device may execute the method for determining the location of the focus.

In order to implement the above embodiments, the disclosure also provides a computer program product.

When the computer program product is executed by the processor of the electronic device, the electronic device may execute the method for determining the location of the focus.

Figure 13:
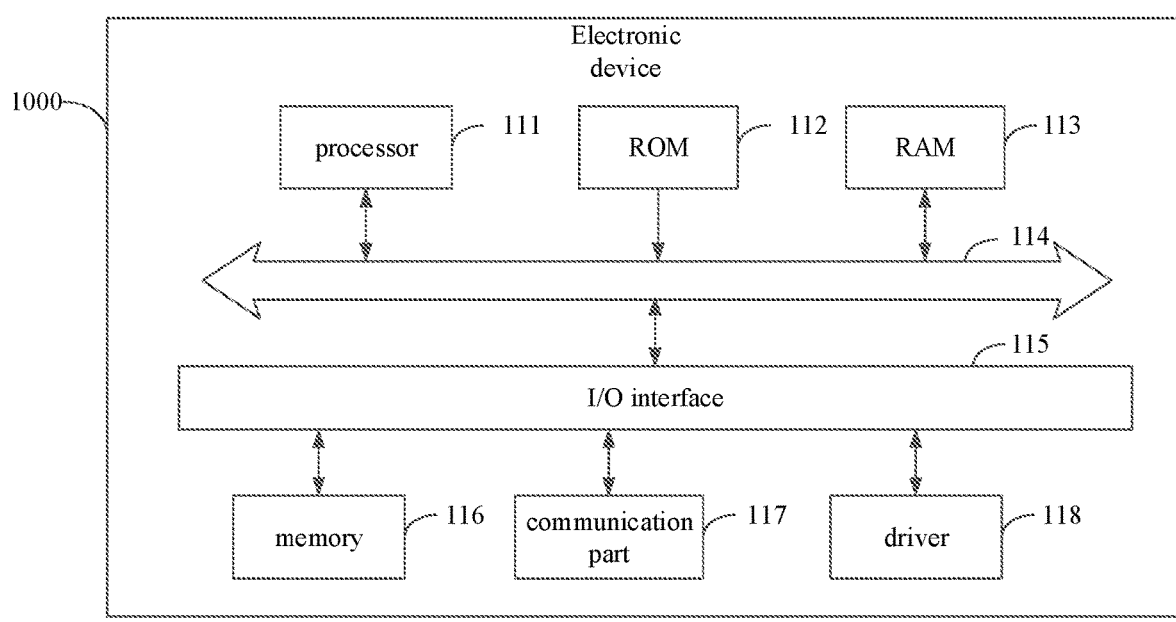
FIG. 13 is a block diagram of an electronic device according to some embodiments of the disclosure.

FIG. 13 is a block diagram of an electronic device according to some embodiments of the disclosure. The electronic device illustrated in FIG. 13 is only an example, and is not restrictive of functions and the usable range of embodiments of the disclosure.

As illustrated in FIG. 13, the electronic device 1000 includes a processor 111, which may execute various appropriate actions and processing based on the program stored in a read only memory (ROM) 112 or the program loaded in a random access memory (RAM) 113 from the memory 116. In the RAM 113, various programs and data required for the operations of the electronic device 1000 are also stored. The processor 111, the ROM 112, and the RAM 113 are connected to one another through a bus 114. The input/output (I/O) interface 115 is also connected to the bus 114.

The following components are connected to the I/O interface 115: a memory 116 including a hard disk, and the like; and a communication part 117 including a network interface card, such as a LAN (Local Area Network) card, a modem, and the like, which is executed by a network communication processing such as the Internet; and the driver 118 is also connected to the I/O interface 115 as needed.

In particular, based on embodiments of the disclosure, the processes described above with reference to the flow charts may be implemented as computer software programs. For example, the embodiments of the disclosure include a computer program carried on a computer-readable medium, in which the computer program includes program codes for executing the method illustrated in the flow chart. In such some embodiments, the computer program may be downloaded and installed from the network through the communication part 117. When the computer program is executed by the processor 111, the processor 111 executes the above functions defined in the method of the disclosure.

In some exemplary embodiments, there is also provided a storage medium including instructions, such as the memory including instructions. The instructions may be executable by the processor 111 in the electronic device 1000, for performing the above methods. Optionally, the storage medium may be a non-transitory computer-readable storage medium, for example, the non-transitory computer-readable storage medium may be a ROM, a RAM, a CD-ROM, a magnetic tape, a floppy disc, an optical data storage device, and the like.

In the disclosure, a computer-readable storage medium may be any tangible medium that includes or stores programs, in which the programs may be used by or in combination with instruction execution systems, apparatus, or devices. In the disclosure, a computer-readable signal medium may include data signals spread in a baseband or as a part of a carrier wave, in which a computer-readable program code is carried. The spreading data signals may take many forms, including but not limited to electromagnetic signals, optical signals, or any appropriate combination of the above. The computer-readable signal medium may also be any computer-readable medium other than the computer-readable storage medium. The computer-readable medium may transmit, spread, or transmit programs for use by or in combination with the instruction execution systems, apparatus, or devices. The program code included in the computer-readable medium may be transmitted by any suitable medium, including but not limited to: wireless, wire, optical cable, RF, and the like, or any suitable combination of the above.

The technical solutions provided in embodiments of the disclosure may at least have the following beneficial effects.

In the embodiments of the disclosure, the location of the focus may be quickly and accurately determined through the layout direction of the current page element and the movement direction of the focus, thereby improving the speed and accuracy of the focus, and enhancing the user experience Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the precise structure described above and illustrated in the drawings, and various modifications and changes may be made without departing from its scope. The scope of the disclosure is only limited by the appended claims.

What is claimed is:

1. A method for determining a location of a focus, comprising:
    obtaining a current location of the focus in an electronic device;
    determining a current page element located by the focus based on the current location of the focus, wherein the current page element comprises a plurality of page sub-elements, and the current location of the focus is one of the plurality of page sub-elements;
    obtaining an instruction for controlling the focus;
    obtaining a movement direction of the focus based on the instruction;
    obtaining a layout direction of the current page element, wherein the layout direction is an arrangement direction of the plurality of page sub-elements in the current page element;
    returning to a parent page element of the current page element in response that the movement direction of the focus is inconsistent with the layout direction and determining the location of the focus in the parent page element, wherein when the movement direction is upward or downward and the layout direction is horizontal, the movement direction of the focus is inconsistent with the layout direction; and when the movement direction is left or right and the layout direction is vertical, the movement direction of the focus is inconsistent with the layout direction;
    returning to the parent page element of the current page element in response that the movement direction of the focus is consistent with the layout direction and a side of the movement direction of the focus is an edge of the current page element and determining the location of the focus in the parent page element, wherein when the movement direction is upward or downward and the layout direction is vertical, the movement direction of the focus is consistent with the layout direction; and when the movement direction is left or right and the layout direction is horizontal, the movement direction of the focus is consistent with the layout direction;

determining the location of the focus in the current page element in response that the movement direction of the focus is consistent with the layout direction and a side of the movement direction of the focus is not an edge of the current page element.

2. The method as claimed in claim 1, wherein determining the location of the focus in the parent page element comprises:
obtaining a plurality of first page sub-elements in the parent page element;
obtaining a plurality of first distances between the plurality of first page sub-elements and the current location of the focus;
determining a target first page sub-element corresponding to a shortest distance of the plurality of first distances; and
keeping the focus on the target first page sub-element.

3. The method as claimed in claim 1, wherein determining the location of the focus in the parent page element comprises:
obtaining a plurality of third page sub-elements in the parent page element;
obtaining a loading sequence of the plurality of third page sub-elements;
determining a plurality of first priorities between the plurality of third page sub-elements and the current location of the focus based on the loading sequence;
determining a target third page sub-element corresponding to a highest priority of the plurality of first priorities; and
keeping the focus on the target third page sub-element.

4. The method as claimed in claim 1, wherein determining the location of the focus in the current page element comprises:
obtaining a plurality of second page sub-elements in the current page element;
obtaining a plurality of second distances between the plurality of second page sub-elements and the current location of the focus;
determining a target second page sub-element corresponding to a shortest distance of the plurality of second distances; and
keeping the focus on the target second page sub-element.

5. The method as claimed in claim 1, wherein determining the location of the focus in the current page element comprises:
obtaining a plurality of fourth page sub-elements in the current page element;
obtaining a loading sequence of the plurality of fourth page sub-elements;
determining a plurality of second priorities between the plurality of fourth page sub-elements and the current location of the focus based on the loading sequence;
determining a target fourth page sub-element corresponding to a highest priority of the plurality of second priorities; and
keeping the focus on the target fourth page sub-element.

6. The method as claimed in claim 1, wherein returning to the parent page element of the current page element and determining the location of the focus in the parent page element comprises:
returning to a previous page element of the current page element; and
determining the location of the focus in the previous page element.

7. The method as claimed in claim 1, wherein returning to the parent page element of the current page element and determining the location of the focus in the parent page element comprises:
returning to a previous page element of the current page element; and
determining the location of the focus in the previous page element in response that a layout direction of the previous page element is consistent with the movement direction of the focus.

8. The method as claimed in claim 7, further comprising:
continuing to search for the parent page element in response that the layout direction of the previous page element is inconsistent with the movement direction of the focus;
determining the location of the focus in the parent page element whose movement direction is consistent with the movement direction of the focus; and
informing a user in response to no parent page element whose movement direction is consistent with the movement direction of the focus.

9. An electronic device, comprising:
a processor;
a memory for storing instructions executable by the processor;
wherein the processor is configured to execute the instructions, to:
obtain a current location of the focus in an electronic device;
determine a current page element located by the focus based on the current location of the focus, wherein the current page element comprises a plurality of page sub-elements, and the current location of the focus is one of the plurality of page sub-elements;
obtain an instruction for controlling the focus;
obtain a movement direction of the focus based on the instruction;
obtain a layout direction of the current page element, wherein the layout direction is an arrangement direction of the plurality of page sub-elements in the current page element;
return to a parent page element of the current page element in response that the movement direction of the focus is inconsistent with the layout direction and determine the location of the focus in the parent page element, wherein when the movement direction is upward or downward and the layout direction is horizontal, the movement direction of the focus is inconsistent with the layout direction; and when the movement direction is left or right and the layout direction is vertical, the movement direction of the focus is inconsistent with the layout direction;
return to the parent page element of the current page element in response that the movement direction of the focus is consistent with the layout direction and a side of the movement direction of the focus is an edge of the current page element and determine the location of the focus in the parent page element, wherein when the movement direction is upward or downward and the layout direction is vertical, the movement direction of the focus is consistent with the layout direction;

and when the movement direction is left or right and the layout direction is horizontal, the movement direction of the focus is consistent with the layout direction;

determine the location of the focus in the current page element in response that the movement direction of the focus is consistent with the layout direction and a side of the movement direction of the focus is not an edge of the current page element.

10. The device as claimed in claim 9, wherein the processor is configured, when determining the location of the focus in the parent page element, to:

obtain a plurality of first page sub-elements in the parent page element;

obtain a plurality of first distances between the plurality of first page sub-elements and the current location of the focus;

determine a target first page sub-element corresponding to a shortest distance of the plurality of first distances; and keep the focus on the target first page sub-element.

11. The device as claimed in claim 9, wherein the processor is configured, when determining the location of the focus in the parent page element, to:

obtain a plurality of third page sub-elements in the parent page element;

obtain a loading sequence of the plurality of third page sub-elements;

determine a plurality of first priorities between the plurality of third page sub-elements and the current location of the focus based on the loading sequence;

determine a target third page sub-element corresponding to a highest priority of the plurality of first priorities; and keep the focus on the target third page sub-element.

12. The device as claimed in claim 9, wherein the processor is configured, when determining the location of the focus in the current page element, to:

obtain a plurality of second page sub-elements in the current page element;

obtain a plurality of second distances between the plurality of second page sub-elements and the current location of the focus;

determine a target second page sub-element corresponding to a shortest distance of the plurality of second distances; and keep the focus on the target second page sub-element.

13. The device as claimed in claim 9, wherein the processor is configured, when determining the location of the focus in the current page element, to:

obtain a plurality of fourth page sub-elements in the current page element;

obtain a loading sequence of the plurality of fourth page sub-elements;

determine a plurality of second priorities between the plurality of fourth page sub-elements and the current location of the focus based on the loading sequence;

determining a target fourth page sub-element corresponding to a highest priority of the plurality of second priorities; and keep the focus on the target fourth page sub-element.

14. The device as claimed in claim 9, wherein the processor is configured, when returning to the parent page element of the current page element and determining the location of the focus in the parent page element, to:

return to a previous page element of the current page element; and determine the location of the focus in the previous page element in response that a layout direction of the previous page element is consistent with the movement direction of the focus.

15. A non-transitory computer-readable storage medium, wherein when instructions in the storage medium are executed by a processor of an electronic device, the electronic device is caused to perform:

obtaining a current location of the focus in an electronic device;

determining a current page element located by the focus based on the current location of the focus, wherein the current page element comprises a plurality of page sub-elements, and the current location of the focus is one of the plurality of page sub-elements;

obtaining an instruction for controlling the focus;

obtaining a movement direction of the focus based on the instruction;

obtaining a layout direction of the current page element, wherein the layout direction is an arrangement direction of the plurality of page sub-elements in the current page element;

returning to a parent page element of the current page element in response that the movement direction of the focus is inconsistent with the layout direction, and determining the location of the focus in the parent page element, wherein when the movement direction is upward or downward and the layout direction is horizontal, the movement direction of the focus is inconsistent with the layout direction; and when the movement direction is left or right and the layout direction is vertical, the movement direction of the focus is inconsistent with the layout direction;

returning to the parent page element of the current page element in response that the movement direction of the focus is consistent with the layout direction and a side of the movement direction of the focus is an edge of the current page element and determining the location of the focus in the parent page element, wherein when the movement direction is upward or downward and the layout direction is vertical, the movement direction of the focus is consistent with the layout direction; and when the movement direction is left or right and the layout direction is horizontal, the movement direction of the focus is consistent with the layout direction;

determining the location of the focus in the current page element in response that the movement direction of the focus is consistent with the layout direction and a side of the movement direction of the focus is not an edge of the current page element;

recording the current location of the focus in the current page element; and positioning the focus to the current location in response that the focus returns to the current page element.

16. The method as claimed in claim 1, further comprising:

recording the current location of the focus in the current page element; and positioning the focus to the current location in response that the focus returns to the current page element.

17. The device as claimed in claim 9, wherein the processor is configured to execute the instructions, to:

record the current location of the focus in the current page element; and position the focus to the current location in response that the focus returns to the current page element.

* * * * *